United States Patent [19]

Daniel et al.

[11] 4,360,277

[45] Nov. 23, 1982

[54] PORTABLE FABRIC TEMPERATURE PROFILER

[75] Inventors: Vernon T. Daniel, Oak Ridge; Edward J. Robbins; Kenneth Y. Wang, both of Greensboro, all of N.C.

[73] Assignee: Burlington Industries, Inc., Greensboro, N.C.

[21] Appl. No.: 221,811

[22] Filed: Dec. 31, 1980

[51] Int. Cl.³ ........................................... G01K 13/06
[52] U.S. Cl. .................................................. 374/137
[58] Field of Search ................. 73/159, 343 R, 359 R, 73/359 A; 136/221

[56] References Cited

U.S. PATENT DOCUMENTS

| | | |
|---|---|---|
| 2,441,562 | 5/1948 | Chase et al. |
| 3,333,476 | 8/1967 | Hardy et al. |
| 3,533,288 | 10/1970 | Frank ................................ 73/343 R |
| 3,540,280 | 11/1970 | Schoenlaub ........................... 73/343 |
| 3,871,212 | 3/1975 | Neugroschl. |
| 3,875,799 | 4/1975 | Webster ............................... 73/359 |
| 4,046,009 | 9/1977 | Sauer. |
| 4,104,917 | 8/1978 | Rieth .................................. 73/343 |

Primary Examiner—S. Clement Swisher

Attorney, Agent, or Firm—Cushman, Darby & Cushman

[57] ABSTRACT

A method and apparatus are provided for obtaining a temperature profile of a moving substrate, particularly a fabric web moving through a linear drying or heat-setting oven. Without arresting fabric movement, a temperature sensing probe, preferably a thermocouple mounted on a support, is placed in engagement with a specific point of the fabric web, sharpened pins on the support, penetrating and engaging the web. The temperature probe is connected by a wire to a reel. The reel has a handle held by the operator about which the reel rotates to letout and takeup the wire while providing electrical continuity between the wire and a stationary recorder. Level unwinding of the wire takes place from the reel as the probe moves with the fabric through the oven, the probe continuously monitoring the temperature of the specific fabric point and feeding signals back to the recorder through the wire. Without arresting fabric movement, once the probe is through the oven the support is removed from the web, and the reel is rotated to takeup the wire. The wire is disconnected from the probe prior to the wire being reeled up, and the probe is carried back to the oven entrance to repeat the procedure as necessary.

21 Claims, 9 Drawing Figures

PORTABLE FABRIC TEMPERATURE PROFILER

BACKGROUND AND SUMMARY OF THE INVENTION

In many industrial and commercial processes it is highly desirable to have a temperature profile of a component as it moves through the process, or a part of the process. This information can be very useful in optimizing the quality and uniformity of the process treatments, minimizing energy consumption, and locating potential trouble spots in the process. In the context of the invention, the temperature profile is the record of the changing temperature of a single spot on a component such as a moving fabric.

The determination of an accurate temperature profile is especially useful in the textile industry in general, and particularly in textile fabric heat-setting and drying. In the treatment of fabric webs in conventional drying and heat-setting ovens, the oven temperature is commonly set at a predetermined level based on the operator's past experience and only after problems develop, whether they are overheating, underheating, or side-to-side variation, is a correction made in oven temperature, etc. Little assurance of the correct operating condition appropriate for a required time and temperature profile is provided. Because of this, various proposals and techniques have been tried with a view toward obtaining an accurate temperature profile, i.e., temperature history.

One proposed technique for obtaining a fabric temperature profile is to mount a temperature sensor together with electronic processor and memory device on the moving fabric web as it moves through the oven. This system stores and records a temperature profile of the fabric as it rides along through the oven with the fabric. Such a system is not practical, however, due to the expense of selecting appropriate components that can withstand the oven temperatures while passing through the oven, the large mass of the system, and the high cost of replacement when a sensor is damaged.

A further proposal, adapted for use in baking ovens, is to insert a probe into the article being baked and send the probe, along with other components which together form a transmitter, through the oven. The signal from the moving transmitter is beamed out of the oven to a stationary receiver which then receives and interprets the signal. Transistors are noted to be present in at least two of the components utilized. Since the temperature of the oven is normally above the maximum operating temperature of any normally available transistors, the unit is encased in heat insulating material and surrounded by a further enclosure containing solid carbon dioxide. Such an arrangement is impractical since the cooling source must be continuously replenished. Additionally, the temperature probe provided for such a system is not readily adaptable for use with a fabric web, and the components of the system are relatively complicated and expensive.

According to the present invention, a method and apparatus have been provided that overcome the drawbacks inherent in the prior art, as exemplified by the prior art mentioned above. The apparatus according to the present invention is simple, inexpensive, and easy to use. While the apparatus is particularly adapted for use in temperature profiling of moving fabric webs, it also has applicability to other temperature profiling systems wherein the temperature profile of a moving substrate or web is desired. The apparatus according to the present invention is capable of simply and accurately determining the temperature profile of a fabric web in a drying or heat-setting oven or the like without requiring interruption of the fabric processing. It is to be understood that the term "oven" as used herein is meant to include only those ovens where the progress of goods or components through them is along substantially straight and usually horizontal paths, as in a textile tenter oven. With the knowledge of a continuous temperature profile obtained by utilizing the present method and apparatus, the drying, curing, and heat-setting processes can be optimized, allowing the operator to control the process for optimum time and temperature history. Fabric quality and uniformity of treatment are improved, energy consumption is minimized, production capacity is maximized, and potential trouble spots are located, allowing breakdowns to be prevented.

According to the method of the present invention, a temperature profile of a moving fabric web in a textile treating assembly (e.g., drying or heat-setting tenter oven) is obtained utilizing a temperature sensing probe interconnected by a reeled wire to a monitor. Without arresting of the fabric web movement, the temperature sensing probe—with wire attached—is placed in operative engagement with a specific point of the fabric web, the probe maintaining contact with the point of the web and moving therewith into the entrance of the textile treating assembly. The probe is mounted on a structure having fabric engaging and penetrating sharpened pins so that when the probe supporting structure is merely laid on the moving web the pins penetrate and engage the web while the probe is held in contact therewith. Unreeling of the wire is effected as the probe moves with the fabric web through the textile treating assembly, and the temperature of the specific point of the fabric web is continuously measured by monitoring the temperature data supplied by the probe. Desirably the temperature data are continuously recorded, with the data used immediately or subsequently to effect correction of operational parameters associated with the textile treating assembly. Without the fabric web movement being arrested the probe is disconnected from the web after it exits the textile treating assembly, and the wire is reeled up. Between the disconnection and reeling steps, preferably the wire is disconnected from the probe so that the wire alone is pulled back through the textile treating assembly while the probe, and its mounting structure, are carried back to the assembly entrance. The reel rotates about an axis to let out the take up the wire while making continuous electrical contact between the wire and the monitor during wire let out and take up, and wire take up may be effected by manually rotating the reel about its axis of rotation and effecting level wind of the wire. If desired, means may instead be provided for winding up the wire with a small electric or the like motor. The word "wire" as used herein is inclusive of the combinations of two or more separate wires or leads comprising or connected to thermocouples, thermistors, resistance thermometers, or the like, as will be obvious to one of ordinary skill in the field of the invention.

According to one aspect of the apparatus of the present invention, a temperature profiler for a moving substrate is provided. The profiler includes as the two major components a means for engaging the substrate, and a means ensuring transmission of the temperature information from the substrate-engaging means to a useful point. Both such means are in themselves unique.

The means for engaging the substrate to move therewith and determine the temperature of a predetermined point thereon includes a support, a contactor mounted to the support, a temperature probe, and a release electrical connector. In the preferred embodiment wherein the temperature profile of a fabric web is determined, the substrate contactor includes at least one sharpened fabric-penetrating pin mounted on the underside of the support. The temperature probe, which preferably comprises a thermocouple, is mounted to the support to extend into operative relationship with the substrate. A handle is preferably provided mounted to the top of the support to allow ready retrieval of the probe from the moving substrate once it traverses its predetermined path, although an automatic removal mechanism may be utilized instead.

The structure utilized for transmitting the temperature data from the probe to a suitable monitoring point includes a wire reel, an elongated electrically conductive wire, means for mounting the reel for rotation about an axis while providing electrical continuity between the wire and an electrically conductive member stationary with respect to the reel, and means for connecting the stationary electrically conductive member to a monitoring device, such as a recorder. The wire is wrapped around the periphery of the reel and an electrical connector, compatible with the releasable connector at the substrate-engaging means, is mounted on one end thereof. The operator holds a handle extending from the reel and not rotatable therewith to support the reel at the entrance to the traversal path of the substrate. Level winding and unwinding of the wire is controlled by an extension arm, level with mechanism, and wire controlling arms biased into contact with the wire around the periphery of the reel. The operator can manually rotate the reel about its axis to effect winding of the wire back onto the reel.

It is the primary object of the present invention to provide a method and apparatus for simply and effectively obtaining a temperature profile of a moving fabric web. This and other objects of the invention will become clear from the detailed description of the invention, and from the appended claims.

DETAILED DESCRIPTION OF THE DRAWINGS

Figure 1:
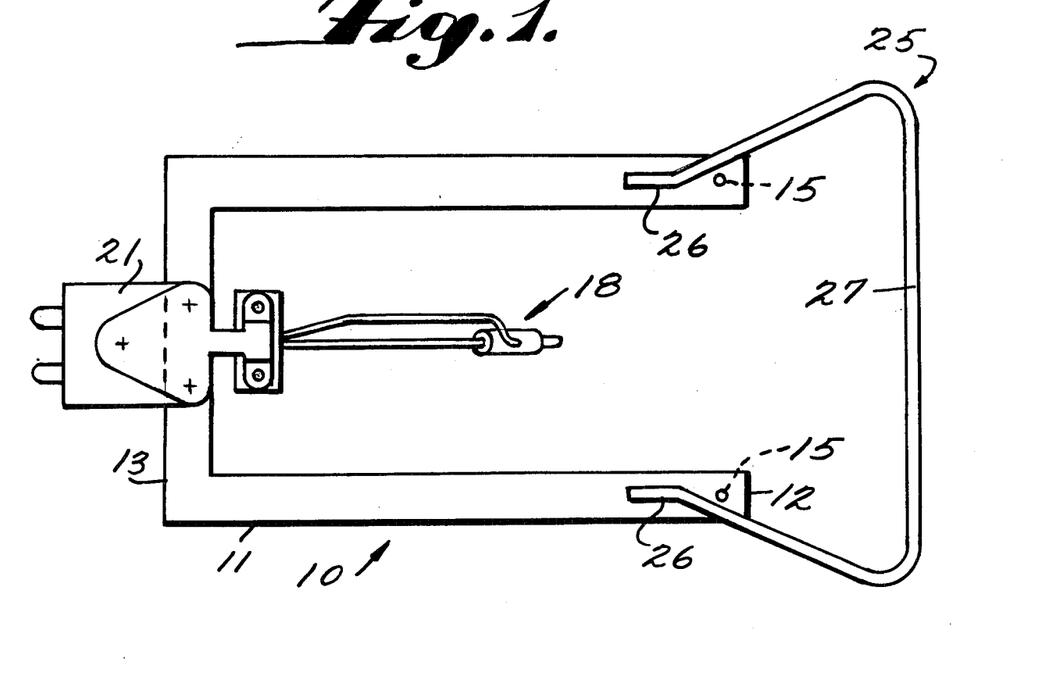
FIG. 1 is a top plan view of an exemplary fabric-engaging component of the apparatus according to the present invention.
Figure 2:
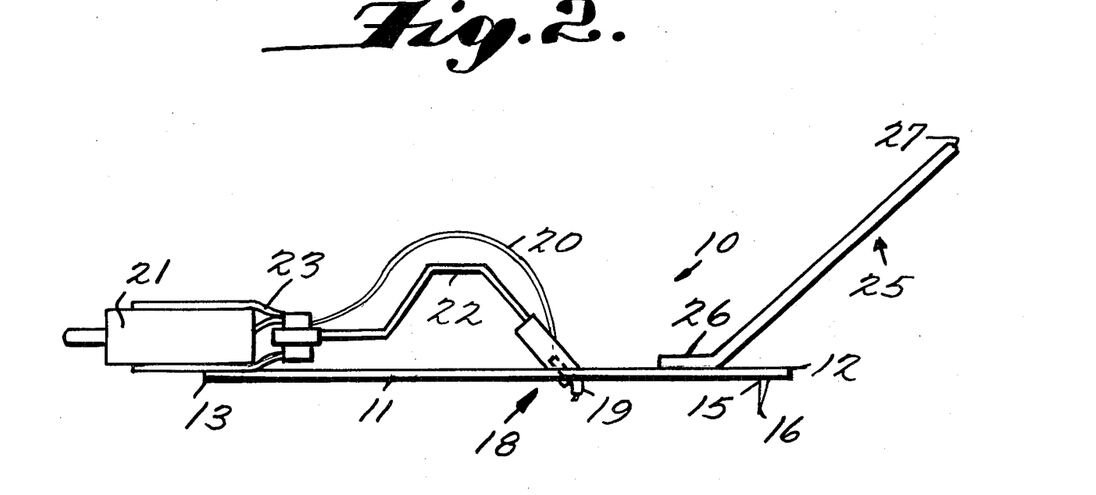
FIG 2 is a side view of the apparatus component of FIG. 1.
Figure 6:
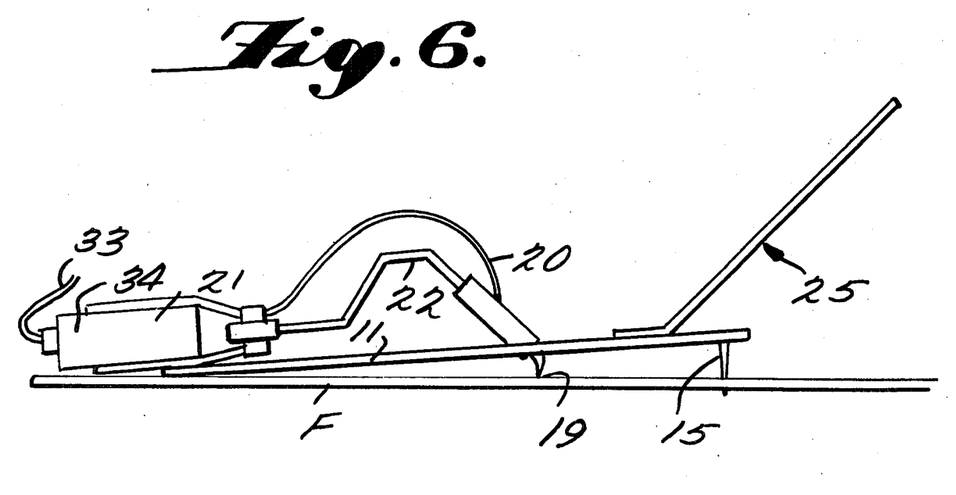
FIG. 6 is a side view showing the traveling apparatus component of FIGS. 1 and 2 connected to a fabric web in temperature-monitoring relationship therewith.

One apparatus component according to the present invention for securing a temperature profile of a moving substrate, such as a fabric web, is illustrated most clearly in FIGS. 1, 2 and 6 generally at reference numeral 10. The apparatus 10 actually engages the moving substrate to be profiled, moving with the substrate as it traverses its path.

The apparatus 10 includes an elongated support 11 having a first end 12 and a second end 13. The preferred form of the support, as illustrated in the drawings, is a generally U-shaped plate-like member, with the base of the U defining the second end 13, and the tips of the arms of the U defining the first end 12. Mounted to the bottom surface of the support 11 is at least one substrate contactor. As illustrated in the drawings, preferably the at least one contactor is formed as a plurality of fabric pins 15, each pin being sharpened to a point 16 so that it is capable of penetrating and engaging a fabric web F or the like (see FIG. 6). When the pins 15 are lowered into contact with the fabric web F, the sharpened points 16 penetrate the web and ensure that the support 11 will be stationary with respect to the area of the web contacted. The pins 15 are mounted adjacent the first end of the support 11, adjacent the tips of the arms of the U.

The apparatus 10 further includes a temperature probe for determining substrate temperature, the probe being illustrated generally at 18 in the drawings. A number of different probe elements can be used, such as thermistors or resistance thermometers, but the preferred form of the probe illustrated in the drawing is a thermocouple having a thermocouple junction 19. Hereinafter, for simplicity, probe 18 and associated components are mostly described in terms of the probe being a thermocouple, and thermocouple junction 19 the point of contact with the web. Thermocouple wire 20 leads from junction 19 to a connection means, such as a male thermocouple plug 21 mounted on the top of support 11 adjacent the second end 13 thereof. Whatever type of probe element is employed, the corresponding electrical connections such as wires and junction plugs must be so selected that they are compatible with the particular probe element, as is well known in the art.

In one particularly preferred and effective embodiment of the invention, 0.010-inch iron-constantan thermocouple wires 20 are joined to make the smallest practical junction 19, from the smallest practical wire. This combination shows a time response which, though the time lag is about the maximum allowable, is at least as fast as the fabric response to heat transfer. Since so small a thermocouple wire inevitably tends to exhibit high electrical resistance, only that portion of the wire from junction 19 to plug 21 is small, the remaining and much longer portions back to the external recorder being made of 0.020-inch iron-constantan.

Means are provided for mounting the temperature probe 18 to the support 11 between the first and second ends 12, 13 thereof so that the probe 18 extends below the support 11 into operative engagement with the web. In the embodiment illustrated in the drawings, the probe 18 is mounted between the arms of the U-shaped support 11 as well as between the ends 12, 13 thereof. A spring wire 22 is cantilevered from the support 11 to the probe 18 and provides means for resiliently biasing the thermocouple junction 19 into direct contact with the top surface of the fabric web F (see FIG. 6). A molded epoxy or phenolic insulating connector 24 unites thermocouple wire 20 and associated thermocouple junction 19 with spring 22, as most clearly seen in FIG. 2. The end of the spring 22 opposite its connection to the probe 18 is operatively connected to the support 11, as to the bracket 23 which in turn is screwed to the base of the U-shaped support 11, and receives the male thermocouple plug 21.

For ready retrieval of the device 10 from the moving web after the device has traversed the predetermined path to be profiled with the web, a retrieval handle 25 is provided. The handle 25 includes base portions 26 thereof which are connected to the top surface of the support 11 (as to the tops of the U-arms thereof), and has a grasping portion 27 extending upwardly from the base portions 26 and past the first end 12 of the support 11, remote from the second end 13 thereof. An operator standing adjacent the moving web may readily grab the grasping portion 27 and pull upwardly on it to remove the whole device 10 from the web.

In some situations where web speed is too great to allow convenient manual removal of the device 10, an automatic means may be provided for removing the device 10 from the moving web, such as a powerful magnet placed above the area of removal.

Figure 3:
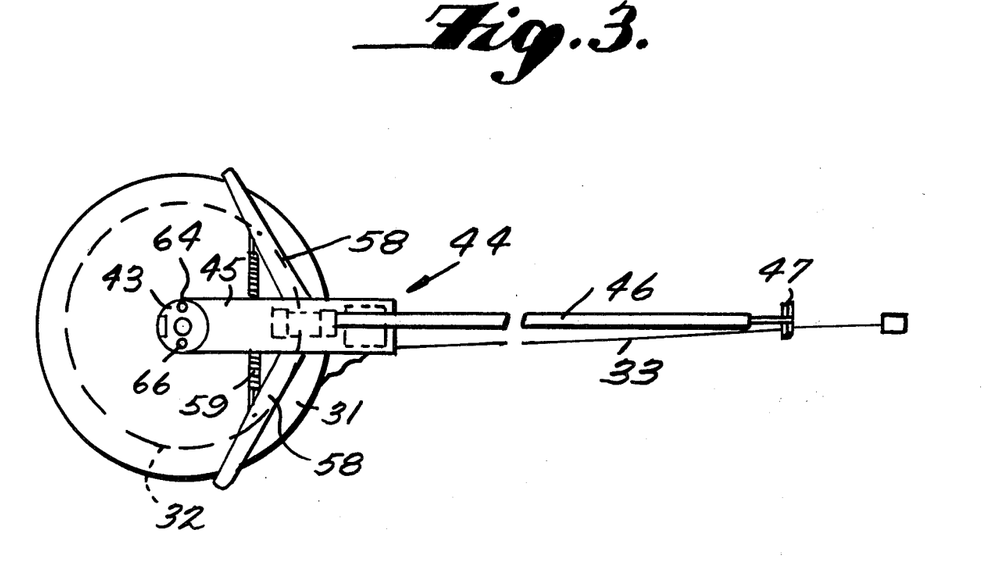
FIG. 3 is a bottom plan view of an exemplary reeling assembly comprising a component part of the apparatus according to the invention.
Figure 4:
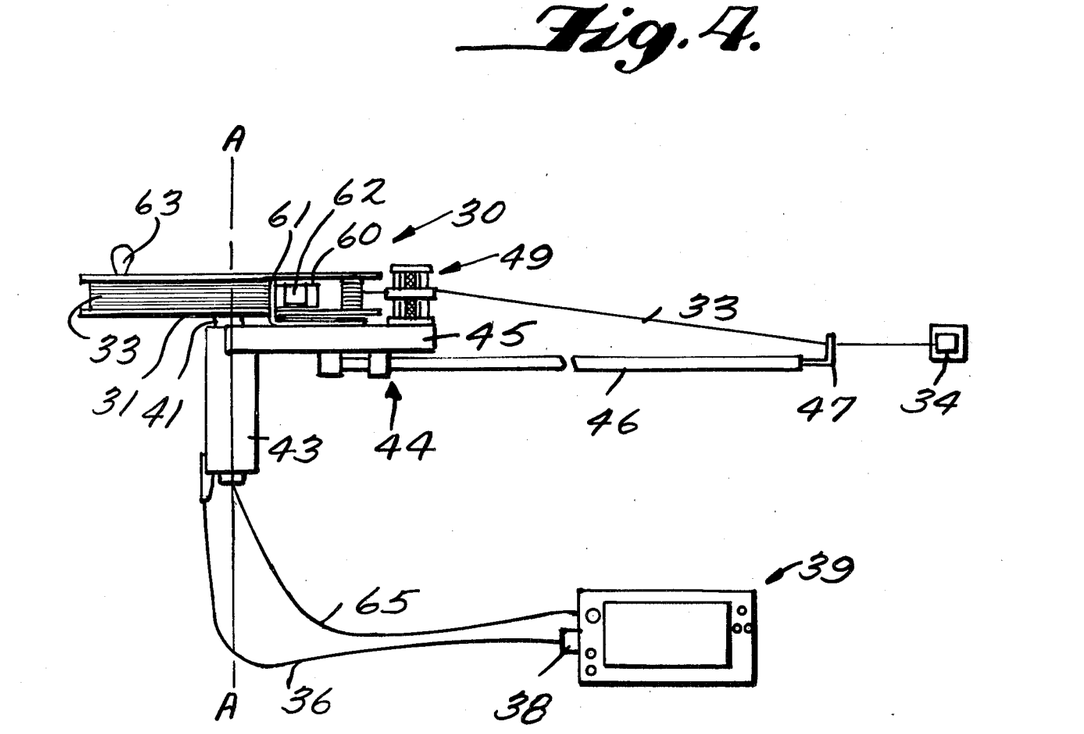
FIG. 4 is a side view of the apparatus component of FIG. 3 shown in conjunction with a recorder.
Figure 5:
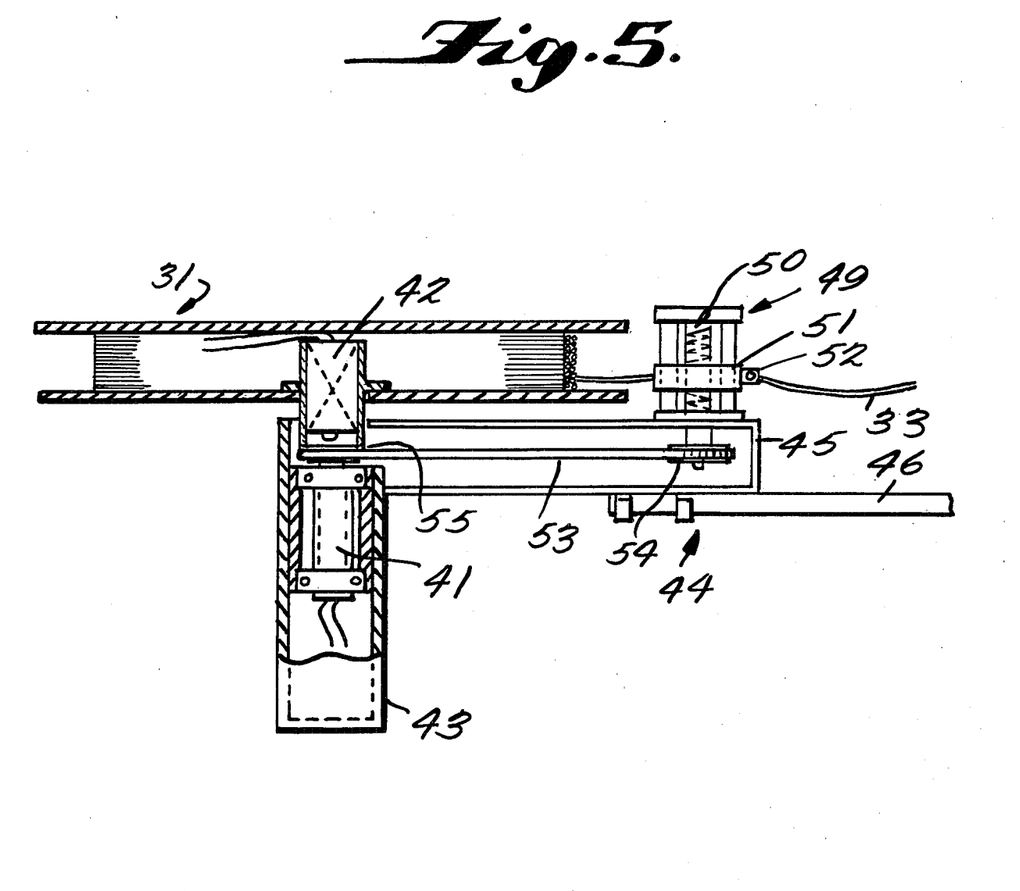
FIG. 5 is a schematic view, partly in cross-section and partly in elevation, illustrating operation of the level wind mechanism of the apparatus of FIG. 4.

The component according to the present invention for carrying and controlling the wire provided for transmitting the temperature signal obtained from the probe 18 back to a stationary monitor remote from the probe is illustrated most clearly in FIGS. 3 through 5, and is indicated generally by reference numeral 30. The device 30 includes a reel 31 having a peripheral portion 32 onto which a wire may be wound. A thermocouple wire 33 is wrapped around the reel periphery 32. The wire 33 has a female thermocouple connector 34 mounted at one end thereof. The connector 34 is compatible with the wire and the male connector 21. When the connectors 21, 34 is engaged (see FIG. 6) the thermocouple junction 19 is electrically connected through wire 20, and the connectors, to wire 33.

The device 30 further comprises means for mounting the reel for rotation about an axis A—A (see FIG. 4) to take up and let out the wire 33 while providing electrical continuity between the wire 33 and further compatible thermocouple wire 36 stationary with respect to the reel 31. Means are also provided, such as a thermocouple plug 38 attached to the end of wire 36, for connecting wire 36 to a monitoring device for receiving temperature data from the probe 18 through the wire 33. The monitoring device preferably comprises a dual channel strip chart recorder, such as a Hewlett-Packard Recorder Model 7100B, illustrated generally at 39 in FIG. 4.

The means for mounting the reel 31 for rotation about the axis A—A preferably includes shaft 41 connected to and extending from the center of the reel 31 coextensive with the axis A—A and having enclosed a conventional slip ring assembly, illustrated schematically at 42 in FIG. 5. The slip ring assembly may comprise any suitable conventional type such as Model SR2 manufactured by Omega Engineering, Inc. Further, a handle 43 surrounds the shaft 41, the handle not being rotatable with the reel 31. The device 30 further includes wire control means for providing let-out and take-up of wire 33 from and to the reel 31 from a predetermined area of the reel periphery. Such wire control means includes an extension arm 44 extending radially outwardly from the handle 43 and stationarily mounted thereto.

The extension arm 44 may include a housing portion 45 and a rod portion 46, a wire guide 47 being provided on the end of the rod 46 remote from the handle 43, the wire 33 passing through the guide 47. The guide 47 and connector 34 are preferably dimensioned so that the connector 34 cannot pass through the guide 47. The wire control means further comprises a level wind mechanism illustrated generally at 49. The level wind mechanism 49 ensures that the wire 33 is wrapped around the reel 31 without overlap so that there will be no snags during take-up and let-out. In accomplishing this function, the level wind mechanism consists of a track cam 50, follower 51, wire guide 52, drive belt 53 and associated belt gears 54, 55.

The belt gear 55 is fastened on shaft 41, and as reel 31 rotates provides power through drive belt 53 to gear belt 54. This gear 54 is mounted on the end of cam 50, so as the reel moves the wire guide 52 causes wire 33 to move across the reel 31 face making uniform layers. Due to the track design on the cam 50, when the follower 51 gets to one end of the cam 50 it reverses, letting a new row of wire 33 begin.

The wire control means further includes a pair of horizontal wire controlling arms 58 which are mounted on the extension arm 44 (e.g. to the top of housing 45) and are spring biased by a spring 59 so that leaf springs 60, attached to vertical extensions 61 of arms 58, engage the wire 33 on the reel 31, a spring 60 being provided on either side of the level wind mechanism 49 (see FIGS. 3 and 4). The connection of the arms 58 to the top of housing 45 is a pivotal connection (not shown) so that the arms 58 are pivotal with respect to each other and with respect to housing 45 under the influence of biasing spring 59.

Figure 9:
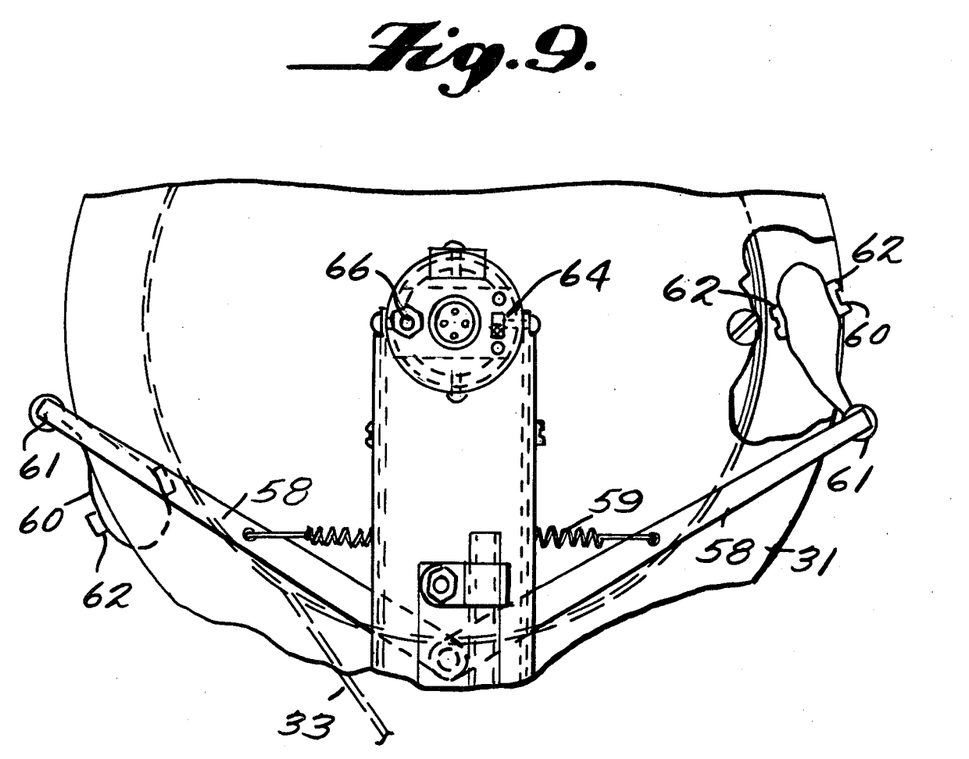
FIG. 9 is a partial detail view of exemplary wire control means of the apparatus of FIGS. 3 and 4.

Each of the two tear-shaped anti-ballooning leaf springs 60 has attached thereto, on opposite sides of the spring loops, two polytetrafluoroethylene wear pads 62 (see FIG. 9), each of which serves in turn, depending upon the direction in which the spring is pointing, as the primary contact surface of the spring against wire 33. The pads are coextensive with the width of peripheral surface 32 of reel 31, such that the wire around the reel is held down firmly by the pads. The springs may assume either of the positions illustrated on the right or left in FIG. 9, depending upon whether the wire is being wound or unwound on the reel 31.

The device 30 further comprises means attached to the reel 31 to effect active rotation thereof about the axis A—A. Such means may comprise a powered component, or—as illustrated in the drawings—may comprise a handle 63 (see FIG. 4) attached to a perimeter portion of the reel 31 on the opposite side thereof from the handle 43, and elongated in a dimension parallel to the axis A—A. An operator grasping handle 63 and acting upon it can effect manual rotation of the reel 31 about the axis A—A.

To allow an operator utilizing the device 30 to control the recorder 39 even when the recorder is remote from the operator's position, an on-off switch 64 (see FIG. 3 in particular) may be provided mounted on the bottom of the handle 43, with appropriate wiring 65 (see FIG. 4) leading from the switch 64 to and from the recorder 39, the recorder being plugged into a suitable power source. Also, if desired an event marker (momentary switch) may also be operatively mounted on the bottom of handle 43, as illustrated schematically at 66 in FIG. 3.

Figure 7:
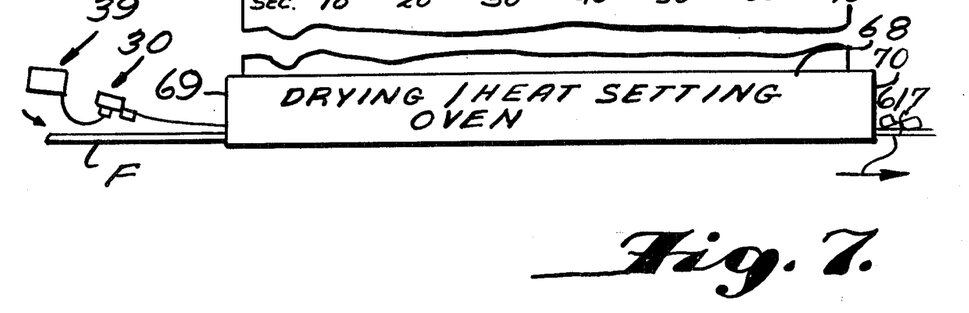
FIG. 7 is a schematic view illustrating an exemplary manner of utilization of the apparatus of FIGS. 1 through 6 in practicing a method of fabric temperature profiling according to the invention.

Utilizing apparatus as heretofore described, it is possible to accurately and simply obtain a temperature profile of a moving fabric web in a drying or heat-setting oven, or the like, according to the method of the present invention. FIG. 7 schematically illustrates utilization of the apparatus heretofore described in practicing the fabric temperature profiling method according to the invention with respect to a fabric web F moving through a drying/heat-setting oven 68.

One operator stands at the entrance 69 to the oven 68, and another operator stands at the exit 70 from the oven. All apparatus components are initially located at the entrance side 69. The connectors 21, 34 are joined, the wires 36, 65 are connected up to the recorder 39, and the power is turned on so that the recorder warms up. The recorder 39 is placed so that it is easily visible to the operator at the entrance 69, but need not be directly next to him since the switch 64 allows remote operation of the chart movement mechanism of the recorder 39.

Figure 8:
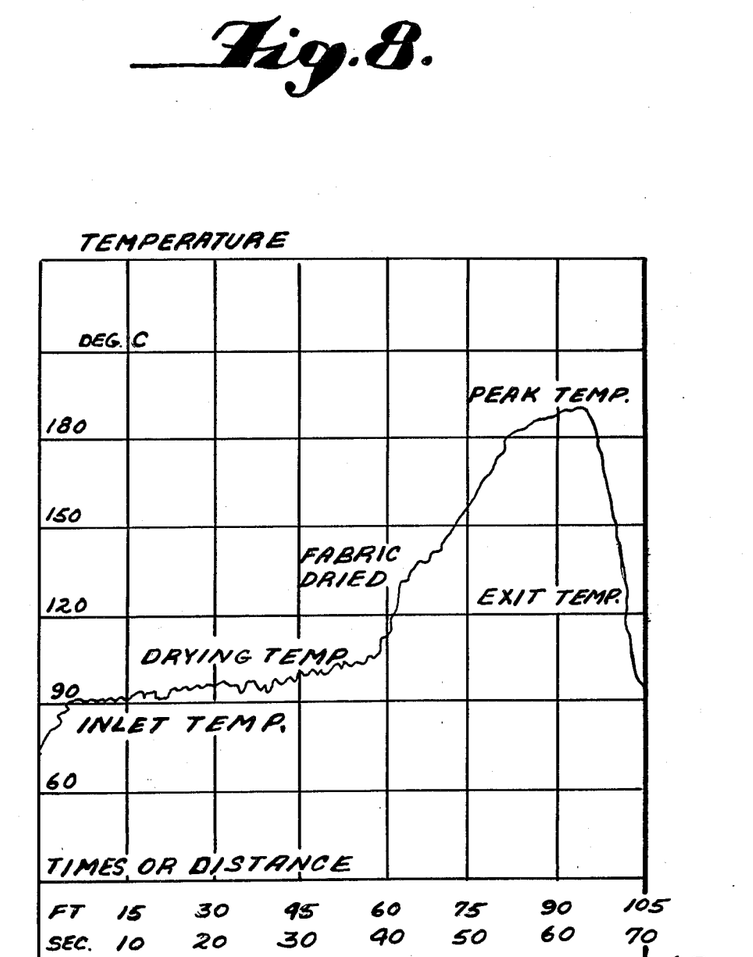
FIG. 8 is a typical temperature profile that may be obtained during practice of the method of the invention, with reference to FIG. 7.

The operator at entrance 69 grasps the device 10 by handle 25 and lays it on the moving fabric web F, without arresting the fabric web movement, so that the sharpened points 16 of pins 15 penetrate the fabric. The cantilever spring 22 biases the thermocouple junction 19 into contact with the top surface of the web F, and the switch 64 is actuated to start the recorder chart movement. As the device 10 moves through the oven 68 with the point on the fabric F which it engages, continuous temperature data are provided by the thermocouple junction 19 through wire 20, connectors 21 and 34, and wire 33, and subsequently through slip ring 42 to wire 36 on to the recorder 39. A typical temperature profile that is obtained in oven 68 is illustrated in FIG. 8, the actual profile illustrated in FIG. 8 being for a three-zone Procter and Schwartz tenter oven when treating 100% polyester textured woven fabric. During the travel of the device 10 through the oven 68, the wire 33 is continuously unwound from the reel 31.

Once the device 10 passes completely through the oven 68 (to the position illustrated in FIG. 7), the operator at the exit 70 from the oven 68 grasps the portion 27 of handle 25 and lifts the device 10 off the fabric F. The operator at the entrance 69 shuts off the recorder 39 utilizing switch 64 while the operator at the exit 70 preferably detaches the connectors 21, 34 so that the wire 33 may be pulled through the oven 68 by itself. The device 10 is then carried back to the entrance 69 for another run, while the operator at entrance 69, holding handle 43, rotates the reel 31 using handle 63, the level wind mechanism 49 ensuring that the wire 33 is properly wound onto the reel periphery 32.

Utilizing the temperature profile of FIG. 8, the operator may then immediately, or subsequently, determine operational parameters that need be adjusted in order to optimize quality and uniformity of treatment, minimize energy consumption, et cetera.

It will thus be seen that according to the present invention a simple yet effective method and apparatus have been provided for obtaining the temperature profile of a fabric web moving through an oven. While the invention has been herein shown and described in what is presently conceived to be the most practical and preferred embodiment thereof, it will be apparent to those of ordinary skill in the art that many modifications may be made thereof within the scope of the invention. For instance, a plurality of temperature probes 18 may be mounted on a single support 11, or a plurality of devices 10, 30, may be associated with a single recorder, computer, or the like; fabric treatment parameters may be modified automatically in response to a temperature reading; and automatic or semi-automatic systems may be utilized for attaching the device 10 to the fabric web (or other substrate) or removing therefrom. Thus, the invention is to be accorded the broadest interpretation of the appended claims so as to encompass all equivalent methods and apparatus.

What is claimed is:

1. A method of obtaining a temperature profile of a moving fabric web in a textile treating assembly utilizing a temperature sensing probe interconnected by a reeled wire to a monitor, comprising the steps of:
(a) without arresting the fabric web movement, placing the temperature sensing probe—with wire attached—in operative engagement with a specific point of the fabric web, the probe maintaining contact with that point of the web and moving therewith into the entrance of the textile treating assembly;
(b) effecting unreeling of the wire as the probe moves with the fabric web through the textile treating assembly;
(c) continuously monitoring the temperature of the specific point of the fabric web as the fabric web moves through the textile treating assembly by monitoring the temperature data supplied by the probe;
(d) without arresting the fabric web movement, disconnecting the probe from the web after it exits the textile-treating assembly; and
(e) reeling up the wire.

2. A method as recited in claim 1 comprising the further step of, between steps (d) and (e), disconnecting the wire from the probe.

3. A method as recited in claim 1 wherein step (c) is practiced by continuously recording the temperature data from the probe, and using the temperature date to control, if necessary, operational parameters associated with the textile treating assembly.

4. A method as recited in claim 1 wherein the reel is rotatable about an axis to let out and take up the wire, and makes continuous electrical contact between the wire and the monitor during wire let-out and take-up, and wherein step (e) is practiced by manually rotating the reel about its axis of rotation while effecting level wind of the wire.

5. A method as recited in claim 1 wherein the temperature sensing probe is mounted on a structure having fabric engaging and penetrating pins, and wherein step (a) is practiced by merely laying the probe supporting structure on the moving web so that the fabric pins will penetrate and engage the web while the probe is held in contact with the web.

6. A web engaging component of a web temperature profiling system, comprising:
an elongated support having first and second ends;
at least one web-engaging pin mounted on said support first end to extend from the bottom of the support for engaging a portion of the web and causing the support to move with the web portion engaged;
a temperature probe means for determining web temperature;

means for mounting said temperature probe means to said support between the first and second ends thereof so that said probe extends from the bottom of said support into operative engagement with the web; and electrical connection means at said support second end and adapted to electrically interconnect said probe means and other remote components of the temperature profiling system.

7. A component as recited in claim 6 wherein said temperature probe means comprises a thermocouple having a thermocouple junction.

8. A component as recited in claim 7 wherein said means for mounting said temperature probe means comprises spring means operatively connected to said support and to said thermocouple for resiliently biasing said thermocouple junction into direct contact with a top surface of a web being profiled.

9. A component as recited in claim 6 wherein said at least one web-engaging pin comprises at least one sharpened pin, having a sharpened tip thereof for penetrating and engaging the web.

10. A component as recited in claim 6, 7, 8, or 9 wherein said support comprises a generally U-shaped plate-like member with the tips of the arms of the U defining the first end of the support, and the base of the U defining the second end of the support; and wherein a pair of pins are provided, one mounted to each of the U arms adjacent the ends thereof; and wherein said temperature probe mounting means comprises means for mounting the temperature probe for operatively engaging the web between the legs of the U; and wherein said electrical connection means comprises one each of compatible male and female electrical plugs, and is mounted to the top of the base of the U.

11. A component as recited in claim 10 further comprising a handle having base portions thereof mounted to the top surfaces of each of the legs of the U, and having a grasping portion thereof extending upwardly from the base portions, and past the first end of the support, remote from the second end thereof.

12. A component as recited in claim 6 or 7 further comprising a handle mounted to and extending upwardly from the top surface of the support.

13. A temperature profiler for a moving substrate, comprising:

means for engaging the substrate to move therewith and determine the temperature of a predetermined point thereon as the substrate moves through a given path, said substrate engaging means comprising: a support; a substrate contactor mounted to said support; a temperature probe; means for mounting the temperature probe to the support to extend into operative relationship with the substrate; and a releasable electrical connector mounted to the support and electrically connected to said temperature probe;

a wire reel;

an elongated electrically conductive wire wrapped around said reel and having an electrical connector, compatible with said substrate-engaging means releasable electrical connector, at one end thereof;

means for mounting said reel for rotation about an axis to takeup and letout said wire, while providing electrical continuity between said wire on said reel and an electrically conductive member stationary with respect to said reel; and means for connecting said stationary electrically conductive member to a device for receiving temperature data from said temperature probe through said reel-mounted wire.

14. A profiler as recited in claim 13 further comprising wire control means for providing let out and take up of wire from and to the reel from a predetermined area of the reel periphery; and means attached to said reel to effect active rotation of the reel about the axis of rotation thereof; and wherein said reel mounting means includes a shaft extending from the center of the reel along said axis; and a handle surrounding said shaft and coextensive with the axis of rotation of the reel and not rotatable therewith.

15. A profiler as recited in claim 14 wherein said wire control means comprises an extension arm extending radially outwardly from the handle and stationarily mounted with respect thereto, said extension arm including a wire guide thereon through which said wire passes.

16. A profiler as recited in claim 15 wherein said control means further comprises a level wind mechanism mounted on said extension arm between said wire guide and said reel, through which said wire is wound; and a pair of wire controlling arms mounted on said extension arm and having operative portions spring biased into engagement with the wire on the reel on either side of said level wind mechanism.

17. A profiler as recited in claim 15 wherein said wire guide is dimensioned with respect to said wire electrical connector so that said wire electrical connector cannot pass through said wire guide.

18. A profiler as recited in claim 14 wherein said means attached to said reel to effect active rotation thereof comprises a handle attached to a perimeter portion of said reel on the opposite side thereof as said handle, and elongated in a direction parallel to the axis of rotation of the reel.

19. A profiler as recited in claim 13, 14, or 16 wherein said temperature probe comprises a thermocouple having a thermocouple junction, and wherein said means for mounting said temperature probe resiliently biases said thermocouple junction into contact with the substrate.

20. A profiler as recited in claim 19 wherein said substrate contactor comprises at least one sharpened pin having a sharpened end capable of penetrating and engaging the substrate.

21. A profiler as recited in claim 19 wherein said substrate-engaging means further comprises a handle extending upwardly from said support.

* * * * *